US007922107B2

(12) United States Patent
Fox

(10) Patent No.: US 7,922,107 B2
(45) Date of Patent: Apr. 12, 2011

(54) SPRAY GUN WITH PAINT CARTRIDGE

(76) Inventor: Jeffrey D. Fox, Nerstrand, MN (US)

( * ) Notice: Subject to any disclaimer, the term of this patent is extended or adjusted under 35 U.S.C. 154(b) by 311 days.

(21) Appl. No.: 12/178,229

(22) Filed: Jul. 23, 2008

(65) Prior Publication Data

US 2009/0026290 A1 Jan. 29, 2009

Related U.S. Application Data

(60) Provisional application No. 60/951,772, filed on Jul. 25, 2007.

(51) Int. Cl.
*B05B 1/28* (2006.01)
*F23D 11/24* (2006.01)
*A01G 25/14* (2006.01)
*B05B 1/00* (2006.01)

(52) U.S. Cl. ........ 239/600; 239/291; 239/337; 239/345; 239/376; 239/377; 239/391; 239/DIG. 14

(58) Field of Classification Search .................. 239/290, 239/291, 292, 302, 320, 321, 337, 340, 345, 239/346, 375, 376, 377, 378, 379, 390, 391, 239/397, 526, 600, DIG. 14
See application file for complete search history.

(56) References Cited

U.S. PATENT DOCUMENTS 1,703,359 A 10/1925 Paasche
3,236,459 A * 2/1966 Mcritchie ..................... 239/416
3,747,850 A 7/1973 Hastings et al.
4,811,904 A * 3/1989 Ihmels et al. ................. 239/345
4,817,872 A * 4/1989 Mattson ........................ 239/300
5,496,123 A 3/1996 Gaither
5,617,665 A 4/1997 Hoenig
5,722,950 A 3/1998 Fujita et al.
6,012,651 A * 1/2000 Spitznagel .................... 239/345
6,056,213 A 5/2000 Ruta et al.
6,276,616 B1 8/2001 Jenkins
6,431,466 B1 8/2002 Kitajima
6,585,173 B2 7/2003 Schmon et al.
6,796,514 B1 9/2004 Schwartz
6,820,824 B1 11/2004 Joseph et al.
6,874,702 B2 * 4/2005 Turnbull ....................... 239/526
7,201,336 B2 4/2007 Blette et al.
2005/0145724 A1 7/2005 Blette et al.
2005/0284963 A1 12/2005 Reedy
2006/0065761 A1 3/2006 Joseph et al.
2008/0078849 A1 4/2008 Fox

FOREIGN PATENT DOCUMENTS

DE 102004027789 A1 2/2005

* cited by examiner

*Primary Examiner* — Len Tran
*Assistant Examiner* — Ryan Reis
(74) *Attorney, Agent, or Firm* — Thomas J. Nikolai; Nikolai & Mersereau, P.A.

(57) ABSTRACT

A spray paint gun having a disposable cartridge inserted therein such that paint can flow through the cartridge in the spray gun without touching the spray gun. Since no part of the spray gun has paint touching it, there is no cleaning of the spray gun or its components. The cartridges can be easily inserted into the spray gun and easily removed such that different color paints can be used in the spray gun in quick succession without down time for cleaning. There is no use of solvents for cleaning, making the cartridge spray gun environmentally friendly. The disposable cartridges eliminate expensive time consuming cleaning. The cartridges can be breach loaded into the front portion of a spray gun and front portion containing the cartridge can quickly snapped into place and ready for use by a hinged connection to the rear portion or by other connection means.

13 Claims, 4 Drawing Sheets

SPRAY GUN WITH PAINT CARTRIDGE

BACKGROUND OF THE INVENTION

1. Field of the Invention

This invention relates to liquid spray guns and more particularly to spray guns having easy to install replaceable cartridges for delivery of paint without the paint contacting the spray gun.

2. Description of the Related Art

In a typical spray gun, the interior components of the spray gun must be disassembled for proper cleaning and then reassembled for use. This is time consuming and also creates hazardous waste and disposal costs. Along with these inconveniences, unnecessary exposure to toxic vapors and solvents occurs during cleaning.

It is desirable to be able to quickly and easily change the colors used in paint spray guns without having to clean the spray gun each time a different color is used.

It is desired to have a spray gun with a disposable cartridge that shields the gun itself from exposure to paint such that no clean up is required. It is also desirable to eliminate the use of cleaners, such as solvents, with the associated waste which needs to be disposed of.

The cartridge should be easy to use and be quickly insertable and removable from the spray gun body. A spray gun to accommodate such cartridges, that allows quick and easy connections of the pin in the cartridge to the spray gun trigger and to block air flow bypass around the cartridge is also desired.

SUMMARY OF THE INVENTION

The spray gun uses a paint cartridge consisting of a tube with a front conic portion to engage a needle valve member for controlling the paint flow through the cartridge, a rear end having the needle's proximal end extending therefrom and a connection to a paint source to allow paint to flow through the cartridge when a trigger coupled to the needle's proximal end is actuated.

Several methods of loading the cartridge into the spray gun may be employed.

In one method the spray gun's cartridge receiving chamber is split and is hinged to allow quick and easy access to insert or remove the cartridge by breach loading the front portion of the hinged spray gun and then locking the cartridge in place when the hinged front portion is made to latch with the rear portion.

In a second method, the cartridge is inserted into the rear of the spray gun and locked in place.

In yet another method, the front and rear portions of the spray gun can be disconnected and then fastened together after a cartridge is installed.

Another method would be a chamber in the spray gun having an aperture for inserting the cartridge and then locking the cartridge in place.

By being able to quickly insert a cartridge, the color of the paint being sprayed can be changed without having to clean the spray gun. Further, the spray gun does not have to be cleaned after each use since no paint contacts the spray gun, thus saving cleaning materials and time while eliminating disposal of the cleaning materials and excess paint.

OBJECTS OF THE INVENTION

It is an object of the invention to eliminate the need to clean a spray gun after each use.

It is an object of the invention to eliminate the need for cleaning fluids, cleaning brushes and wipes in readying a spray gun for a next use.

It is an object of the invention to be able to quickly change colors of paint when using the spray gun.

It is an object of the invention to save on clean up time and the costs associated with it.

It is an object of the invention to reduce waste of paint.

It is an object of the invention to reduce down time attributable to clean up and maintenance of spray guns.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
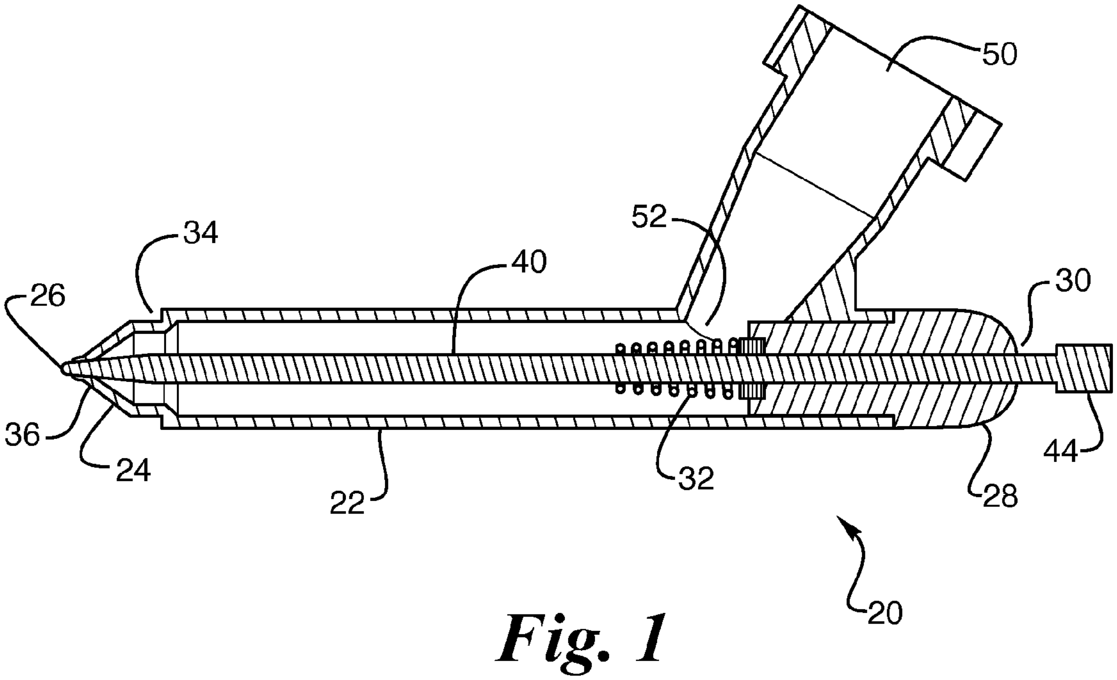
FIG. 1 is a side cross sectional view of a paint cartridge.

A cartridge 20 for a spray gun is shown in FIG. 1. The cartridge 20 has a tubular body 22 and whose front end has a conical nozzle 24 with a concentric aperture 26. The cartridge 20 also has a rear end 28 with an aperture 30 for allowing a needle valve member 40 to slidably pass therethrough. A spring 32 in the cartridge 20 biases the needle valve member 40 forward to press the pointed leading end 36 thereof into the front aperture 26, blocking it to prevent paint from escaping the tubular body 22. The needle valve member 40 has a knob 44 at the rear end 28 for connection to a trigger 62 on the spray gun 60 for adjusting the position of the needle valve member 40 in the tubular body 22 of the cartridge 20. Applicant's patent application Ser. No. 11/540,747 entitled Disposable Spray Gun Cartridge and filed Sep. 30, 2006 showing a cartridge as may be used in spray gun 60 is hereby incorporated by reference.

Figure 2:
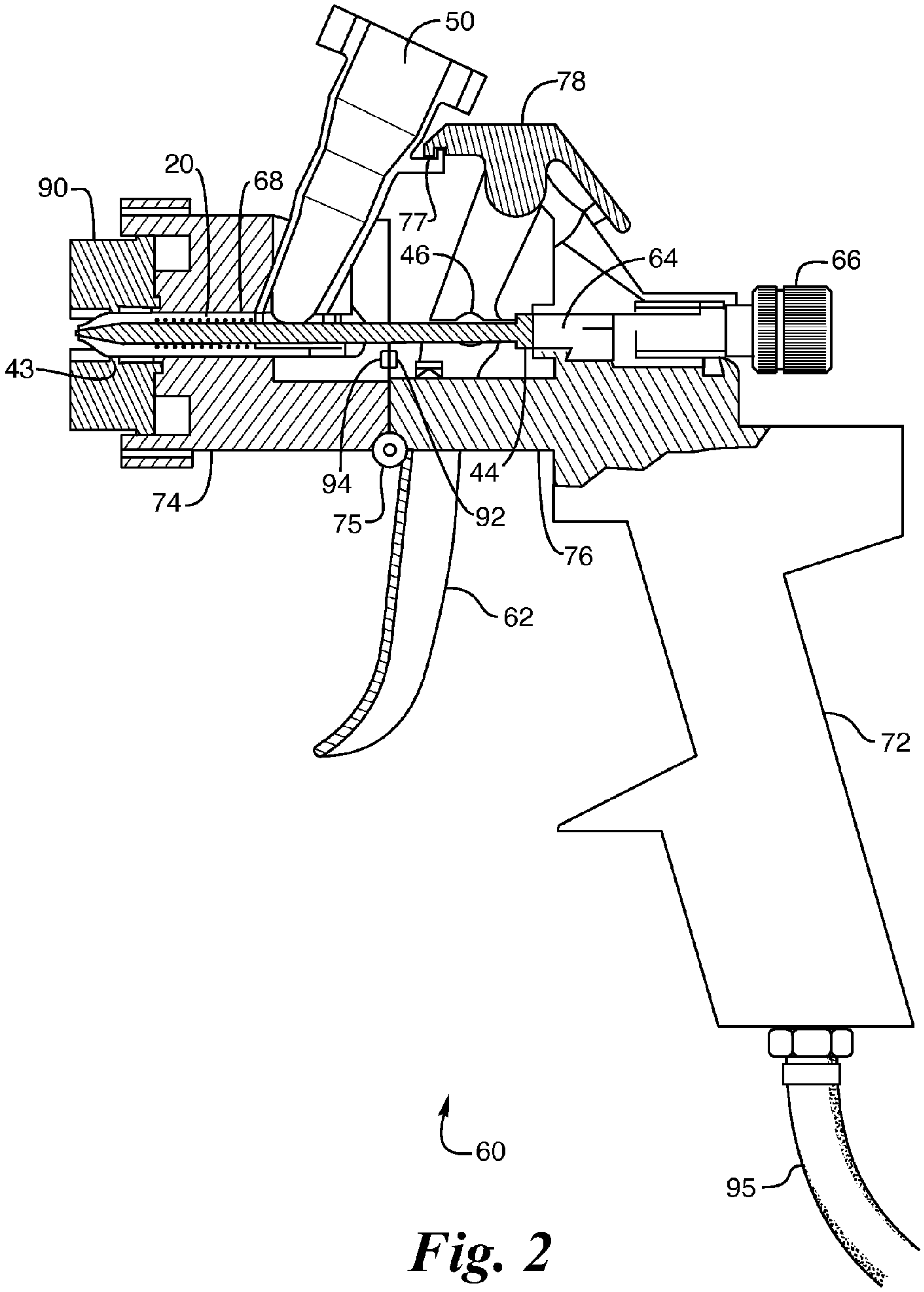
FIG. 2 is a side cross sectional view of a cartridge installed in a hinged spray gun in the closed position.

As illustrated in FIG. 2, a cartridge 20 is shown loaded in a spray gun 60. The spray gun 60 has a trigger 62 which engages the needle valve member 40 to adjust the flow of paint available to be sprayed by the spray gun 60. In the embodiment shown, the trigger 62 has a cradle 46 which the needle 40 rests in. When the trigger 62 is moved aft ward, cradle 46 engages knob 44 on the rear end of the needle valve member 40 and pulls the needle rearward to open the front aperture 26 allowing paint to flow out therefrom. The spray gun 60 also has a spray limit adjustment stop 64 having a knob 66 for screwing the adjustment stop to a desired position for contacting the rear of knob 44 on needle 40 and limiting the size of the opening of the needle valve member 40 relative to the front aperture 26.

Figure 3:
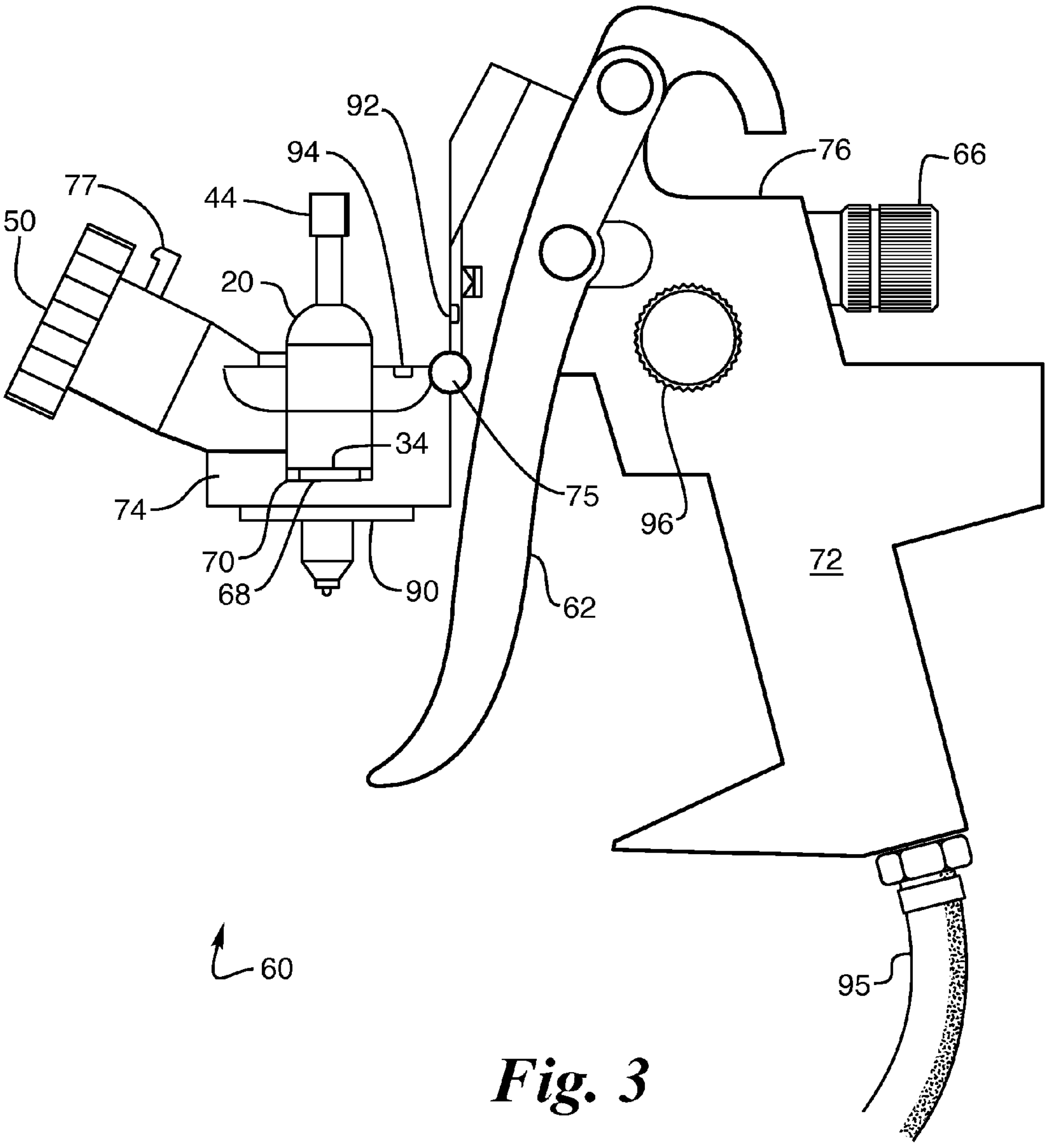
FIG. 3 is a side cross sectional view of a cartridge installed in a hinged spray gun in the open position.

FIGS. 2 and 3 show a hinged embodiment of a breach loading spray gun 60 in accordance with the present invention. The spray gun 60 has a front portion 74, a hinge 75 and a rear portion 76 attached to the front portion by the hinge 75. A cartridge 20 can be inserted into the chamber 68 until the shoulder 34 of the cartridge engages the seat 70 in the front portion 74 of the spray gun 60. When the hinge 75 is operated to close and latch the front portion 74 to the rear portion 76, the cartridge is pushed forward in the chamber 68 by the rear portion 76 such that shoulder 34 is pushed forward until there is a positive stop at seat 70 which creates an air-tight seal between the cartridge 20 and the seat 70, as shown in the embodiment in FIG. 4. Other means for sealing the air inside the spray gun are possible including a tight fit of the cartridge in the cartridge chamber or a seal such as a ring seal 43 as in FIG. 2. The latch, as shown in FIG. 2, comprises a fixed portion 77 and a movable portion 78 which can move up or down to engage or disengage from the fixed portion.

When the spray head assembly 90 on front portion 74 of the spray gun 60 is in place, and the needle valve member 40 is moved by trigger 62, air entrained past the front aperture 26 of cartridge 20 allows for paint to spray from the spray head assembly. The air supply to the spray head assembly 90 is supplied as in any spray gun. For example, it may have air channels which must align, as in air channel 94 in the front portion 74 of the spray gun, to fluidly connect with air channel 92 in the rear portion of the spray gun 76. The air channels 92, 94 may have a close tolerance fit or have seals or have a tube connecting the air channels 92, 94. The air is supplied to the handle 72 though an air hose 95. The air flow control valve knob 96 (as shown in FIG. 3) controls the volume of air delivered to the spray head assembly 90 to control the spray pattern.

Alternatively the air hose 95 may enter the front portion 74 of the spray gun so no air channel connections need be made from the front portion 74 to the rear portion 76.

Figure 4:
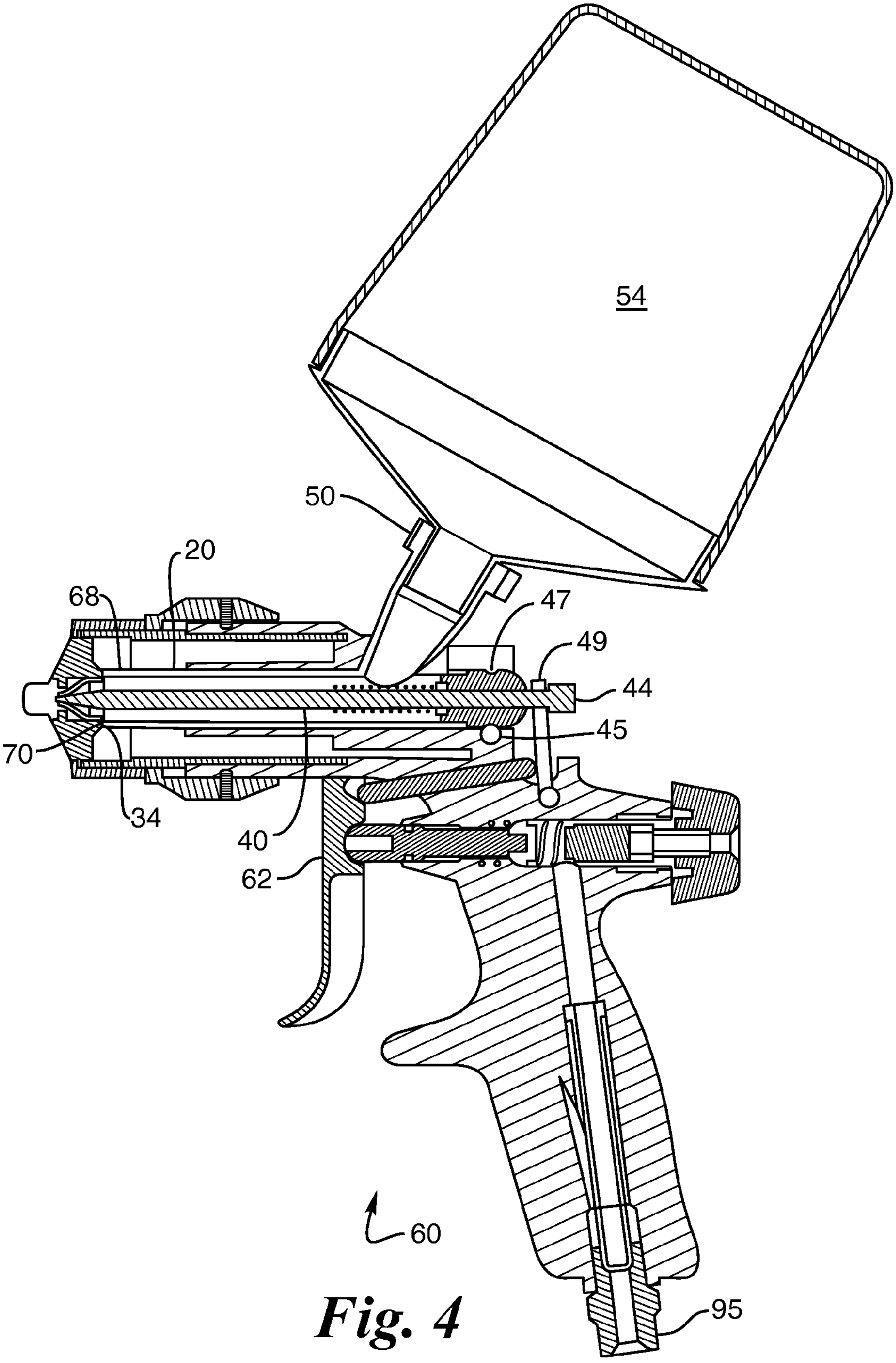
FIG. 4 is a side cross sectional view of a cartridge installed in a rear loading spray gun.

In an alternative embodiment, as shown in FIG. 4, a spray gun has a cartridge 20 having an indented portion 47 on tubular body 22 for engaging a pin 45 which is put in place to lock the cartridge 20 into spray gun 60, a collar 49 activated by trigger 62 is then placed on the back of needle valve member 40 adjacent knob 44 to adjust the position of needle 40 and thus regulate the paint flow in the spray gun.

The embodiment shown in FIG. 4 has a reservoir of paint 54 attached to the cartridge 20. The cartridge may have the reservoir screwed on or the reservoir may be integral with the cartridge. Other means of feeding paint to the cartridge through the paint supply aperture 52 are also possible including the use of a hose running to a paint supply.

The various figures show different embodiments of spray guns with different positions of controls and different features to show that many designs for spray guns may be used with the replaceable cartridges of the present invention. Further, many different customized cartridge designs may be used with different commercially available spray guns.

In an alternative embodiment, not shown, the front portion 74 in FIG. 2 may have threads for screwing onto threads on the rear portion 76. In this manner the cartridge may be inserted in the spray gun 60 by unscrewing the front portion from the rear portion, inserting the cartridge and then screwing on the front portion 74.

In other embodiments, the front portion 74 may be attached to the rear portion 76 by latches, bayonet attachments, snaps, screws or other fasteners which may be of many different types.

In a further embodiment, not shown, a chamber inside of a spray gun barrel can be accessed through an opening in the top of the barrel and a cartridge 20 pushed forward into place by a plunger having a handle to push on the plunger and secure the cartridge 20 in the barrel. The cartridge 20 is therefore pushed forward into the chamber much like a bolt action rifle with the plunger acting like the bolt. The needle is then connected to the trigger.

There may be many means of attaching the trigger 62 to the needle valve member 40 such as pins or collars.

Any type of air flow passages through the spray gun 60 or to the nose of the spray gun may be used so long as the spray head assembly 90 is positioned adjacent the cartridge aperture 26 to allow paint to be entrained in the air flow such that the spray gun functions properly in adjustment of the spray pattern.

The cartridge 20 having a tube for the paint supply connection 50 may have a threaded connection to a paint reservoir or an integral connection to a paint reservoir or be connected by any other means to a source of paint such as a hose from a paint can or a paint pump.

Although the above has been described with paint as the fluid delivered by the spray gun, any substance used in spray guns may be delivered by the cartridge.

Obviously, many modifications and variations of the present invention are possible in light of the above teachings. It is therefore to be understood that, within the scope of the appended claims, the invention may be practiced otherwise than as specifically described.

What is claimed is:

1. A spray gun with a paint cartridge chamber comprising, a hinge connecting a front portion of the spray gun with a rear portion of the spray gun which allows the paint cartridge access to the paint cartridge chamber when the hinge is in the open position and locks the paint cartridge in the paint cartridge chamber when the hinge is in the closed position, the paint cartridge having a needle valve assembly extending through the cartridge and adapted to connect to a trigger on the rear portion of the spray gun when the hinge is in the closed position, the needle valve assembly having an apex for engaging an aperture in a nozzle on the paint cartridge for allowing paint to flow out when the needle valve assembly is withdrawn from the aperture, a tubular connection from the paint cartridge to a paint supply, a spray head assembly on the spray gun adjacent the aperture on the nozzle to deliver an air stream when the trigger moves the needle valve assembly in the paint cartridge to open the aperture for entraining paint from the nozzle, a latch on the spray gun for locking the front portion of the spray gun to the rear portion of the spray gun in the closed position for securing the paint cartridge in place in the paint cartridge chamber.

2. A spray gun with a paint cartridge chamber as in claim 1 wherein, the paint cartridge has a tube connected to an aperture in the paint cartridge for fluidly connecting the paint cartridge to a paint source.

3. A spray gun with a paint cartridge chamber as in claim 2 wherein, the tube has a paint reservoir attached.

4. A spray gun with a paint cartridge chamber as in claim 3 wherein, the tube connects to a hose running to a paint source.

5. A spray gun with a paint cartridge chamber as in claim 1 wherein, the needle valve assembly has a knob on one end, the trigger has a collar connected to the trigger for accepting the needle and engaging the knob for moving the needle when the hinge is in the closed position.

6. A spray gun with a paint cartridge chamber as in claim 1 wherein, the paint cartridge has a shoulder for engaging a seat in the paint cartridge chamber to prevent air from passing by the paint cartridge in the paint cartridge chamber.

7. In combination an air-operated liquid spray gun and a disposable, single use cartridge insertable and removable from the spray gun for isolating the interior of the spray gun from exposure to a liquid to be sprayed, the combination comprising:

a) an air-operated spray gun having a front portion and a rear portion with a means for joining the front portion to the rear portion, arranged such that the front portion can be placed in an open position and a closed position with respect to the rear portion, the front portion including a spray head and a bore extending lengthwise through the front portion and spray head, the rear portion having a handle and a trigger assembly; and b) a cartridge comprising a tubular body adapted to fit into said bore and having a conical apex at a first end thereof, an aperture in the apex, and an end cap at a second end, the end cap having an aperture therethrough, the cartridge further including an elongated needle in the tubular body where the needle has a tapered end for selectively occluding the aperture in the apex and an opposed end passing through the end cap aperture and connectable to the trigger assembly, a helical spring surrounding the needle and operatively disposed to normally bias the needle to an occluding position relative to the aperture in the apex, and an opening in the tubular body connectable to a liquid supply container for introducing the liquid to be sprayed into the tubular body.

8. The combination of claim 7 wherein the cartridge is insertable into the bore of the spray head when the front portion is in its open position with respect to the rear portion and the opposed end of the needle engages the trigger mechanism when the front portion is in its closed position with respect to the rear portion.

9. The combination as in claim 8 and further including a releasable latch adapted to maintain the front portion and the rear portion in the closed position during a spraying operation, release of the latch allowing movement of the front portion to the open position for loading and removal of the cartridges.

10. The combination of claim 9 wherein the latch is connected to the rear portion and is adapted to engage a fixed member on the tubular body of the cartridge when the cartridge is resident in the bore of the front portion and the front portion is in its closed position.

11. The combination of claim 7 wherein the cartridge is a plastic material.

12. The combination of claim 7 wherein the spray gun includes an air passage extending through the handle, the rear portion and through the bore in the front portion to outlets in the spray head located proximate the apex of the cartridge when the cartridge is contained in the bore and the front portion is in the closed position and where a valve actuated by the trigger assembly is located in the passage.

13. A paint spray gun assembly comprising:

(a) a front portion;

(b) a rear portion;

(c) a hinge joining the front portion to the rear portion and allowing the front portion to be selectively open and closed relative to the rear portion;

(d) the front portion including a chamber adapted to have a replaceable paint cartridge inserted therein when open with respect to the rear portion, said paint cartridge having a tubular body with a spring-biased needle valve assembly extending through said tubular body, an apex with an aperture there through at a distal end of the tubular body for cooperating with the needle valve and an opening leading to a paint supply;

(e) a spray head assembly supported by said front portion and having an air passage surrounding the apex of the paint cartridge;

(f) the rear portion including a trigger, a handle having a connection attachable to a compressed air supply and a latch for releasably holding the front portion closed with respect to the rear portion; and (g) latching of the latch with said cartridge loaded in said front portion bringing the compressed air supply into fluid communication with said air passage, coupling the trigger to the spring-biased needle valve assembly and urging the apex of the cartridge into a sealed relation with respect to the spray head assembly, thereby preventing backflow of paint between an exterior of the paint cartridge and the chamber.

* * * * *